United States Patent [19]
Pagani et al.

[11] 3,914,257
[45] Oct. 21, 1975

[54] PURPUROMYCIN ITS DERIVATIVES AND PREPARATION THEREOF

[76] Inventors: Hermes Pagani; Carolina Coronelli; Maria Rosa Bardone, all of Milan; Giancarlo Lancini, Pavia, all of Italy

[22] Filed: Mar. 20, 1974

[21] Appl. No.: 453,111

[30] Foreign Application Priority Data
Mar. 19, 1973 United Kingdom............... 13123/73

[52] U.S. Cl................ 260/343.2 R; 195/17; 195/28; 195/29; 195/42; 424/279
[51] Int. Cl.²................ C07D 407/10; C07D 407/14
[58] Field of Search............................. 260/343.2 R

*Primary Examiner*—James A. Patten
*Attorney, Agent, or Firm*—Theodore Post; C. Kenneth Bjork

[57] ABSTRACT

Antibiotic substances referred to as purpuromycin and its derivatives, which derivatives are obtained by heating purpuromycin under mild basic conditions and by acylation. The purpuromycin derivative obtained by heating the compound under mild basic conditions is hereinafter referred to as isopurpuromycin, while the two acetyl derivatives obtained by acetylation of purpuromycin and of isopurpuromycin are referred to, respectively, as acetyl derivative II and acetyl derivative I. Other acyl derivatives may be obtained wherein the acyl group is derived from $C_2$-$C_4$ mono- or dicarboxylic aliphatic acids which may contain a double bond in the chain or may carry a hydroxy substituent radical. The antibiotic substance purpuromycin is prepared by cultivating *Actinoplanes ianthinogenes* nov. sp. A/1668 under submerged aerobic conditions in aqueous nutrient medium containing an assimilable source of carbon, nitrogen and inorganic salts and recovering purpuromycin therefrom.

10 Claims, 3 Drawing Figures

PURPUROMYCIN ITS DERIVATIVES AND PREPARATION THEREOF

SUMMARY OF THE INVENTION

This invention concerns a novel antibiotic substance referred to as purpuromycin and its derivatives, which derivatives are obtained by heating purpuromycin under mild basic conditions and by acylation. The derivative obtained by treatment under mild basic conditions such as a mild alkaline medium is hereinafter referred to as isopurpuromycin and the two acetyl derivatives obtained by acetylation of purpuromycin and of isopurpuromycin are referred to, respectively, as acetyl derivative II and acetyl derivative I. Other acyl derivatives may be obtained where the acyl group is derived from a $C_2$-$C_4$ mono- or di-carboxylic aliphatic acid which may contain a double bond in the chain or may carry a hydroxy substituent radical. The anti-biotic purpuromycin is prepared by cultivating *Actinoplanes ianthinogenes* nov. sp. A/1668 under submerged aerobic conditions in aqueous nutrient medium containing an assimilable source of carbon, nitrogen and inorganic salts and recovering purpuromycin therefrom.

DESCRIPTION OF THE PREFERRED EMBODIMENTS

Figure 1:
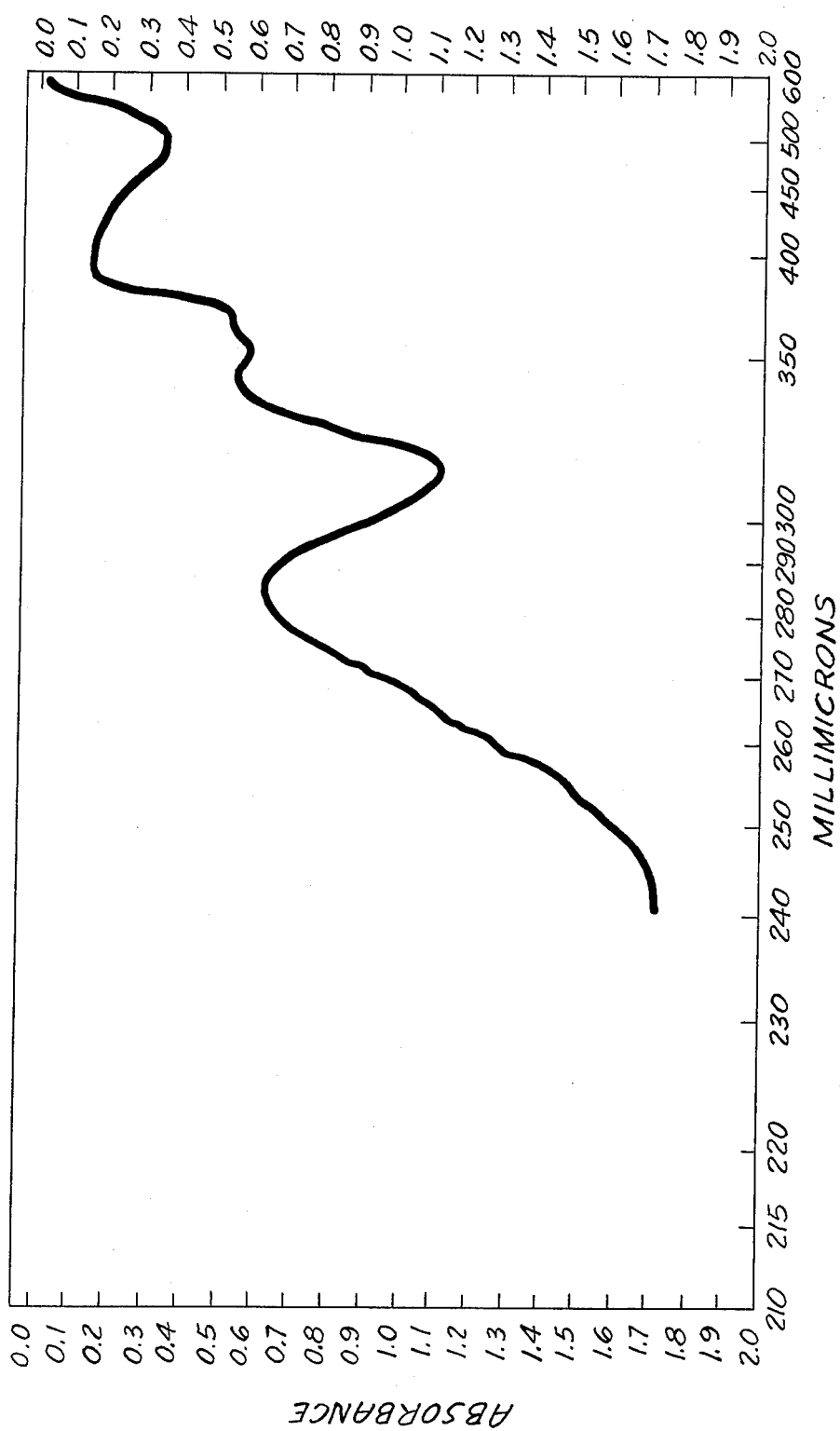

The antibiotic substance purpuromycin and its derivatives are purple-red crystalline substances having characteristic properties such as melting point, infrared, ultraviolet and visible absorption maxima, as well as proton magnetic resonance and mass spectra. On the basis of these data, together with elemental analysis, the pKa and the redox potential values, the antibiotic substance purpuromycin can be assigned the following structural formula:

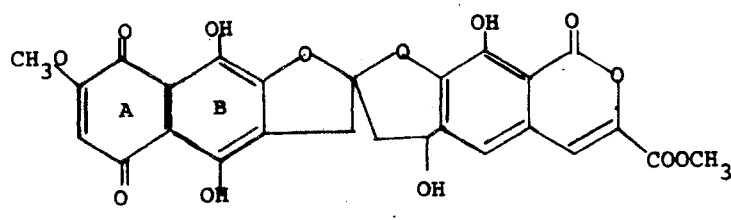

(1)

Isopurpuromycin is an isomeric compound which can be assigned the following formula:

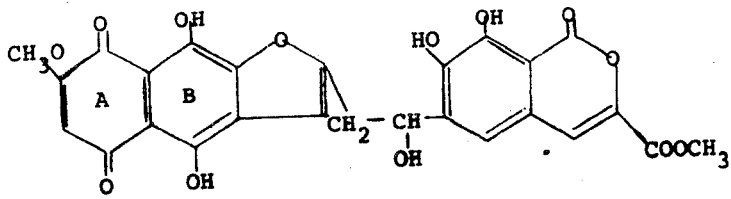

(2)

The structures reported above represent only one of the four tautomeric forms which are possible because of the presence of the 5,8-dihydroxy-1,4-naphthoquinone system (naphthazarin). As already pointed out by R. E. Moore et al. in J. Org. Chemistry 31, 3272, 1966, this ring system is characterized by a rapid keto-enol tautomerism resulting in the simultaneous existence of benzenoid and quinoid properties in both rings A and B. The four possible tautomeric forms may have the following partial structures

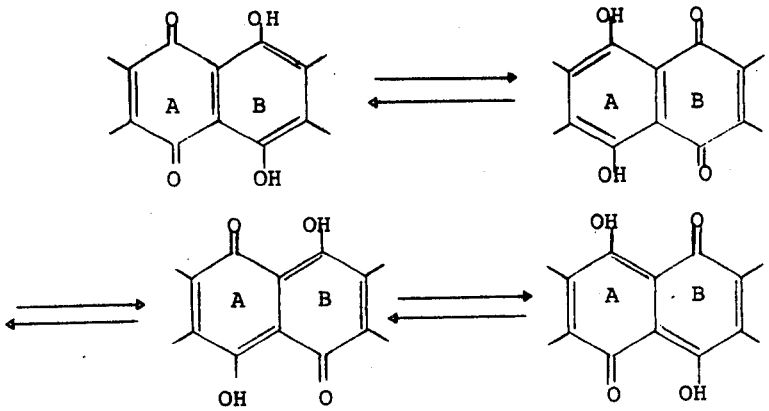

each of them having a different proportion in the actual state of the molecule.

The different contribution of the several tautomers to the effective structure obviously depends on several factors such as, for instance, the particular nature of the substituents on the naphthalene ring, the physical state, the temperature and the solvent employed for solution or crystallization. The several tautomers may also undergo chemical modifications with different reaction rates, so that the reaction product may not correspond to the tautomer distribution of the starting compound.

In the specification and in the claims, the structural formulas (1) and (2) which represent specific tautomers are intended to identify all possible keto-enol tautomeric forms.

Pursuant to this invention, purpuromycin is prepared by cultivation in an appropriate nutrient medium of a strain of the genus Actinoplanes named *Actinoplanes ianthinogenes* nov. sp. A/1668. The strain has been deposited and made part of the stock culture collection of the A.T.C.C., where it was assigned the number 21884. In the preparation of purpuromycin, the said organism is cultivated under submerged aerobic conditions in an aqueous nutrient medium suitable for the growth of said organism, the medium containing an assimilable source of carbon, nitrogen and inorganic salts. Ordinarily, the antibiotic-producing strain is precultured in a shake flask until substantial antibiotic activity is present, then the culture is used to inoculate jar fermentors containing nutrient fermentative medium. Cultivation is continued at about 25° to 35°C under aerobic conditions for a time sufficient to produce a substantial antibiotic level. During this time, microbiological assays are carried out by the agar diffusion method to control the concentration of antibiotic substance. *Staphylococcus aureus* is used as a test organism.

The purpuromycin is isolated from the fermentation medium by conventional procedures such as, for example, by extraction with an organic solvent in which the antibiotic substance is soluble, and which is immiscible with the aqueous medium. A crude precipitate of purpuromycin is thereafter obtained by addition of light petroleum to the organic extract after concentration. The crude purpuromycin is purified by washing with methanol and by column chromatography through silica gel, using chloroform and chloroform:methanol mixtures as the eluents. Purpuromycin is finally crystallized from chloroform containing a small amount of methanol.

Upon heating purpuromycin at about 100°C for about 2 to 3 hours in a mild basic solvent such as pyridine, it is transformed to the isomeric derivative named isopurpuromycin.

Upon heating purpuromycin preferably at about 60° to 80°C in pyridine with acetic anhydride for about 1 hour, two compounds are obtained which are separated by column chromatography through silica gel and eluting with chloroform. The first compound which is eluted may be further purified by crystallization from acetone or from dimethyl sulfoxide in the presence of a small amount of water. This compound is named acetyl derivative I and is a penta-acetyl derivative of isopurpuromycin, i.e., the penta-acetyl derivative of the compound of the formula (2) or one of its tautomeric forms, wherein the five hydroxy groups are acetylated. The latter compound eluted which is named acetyl derivative II is crystallized from acetone and corresponds to a tetra-acetyl derivative of purpuromycin, i.e., the tetra-acetyl derivative of the compound of formula (1) or one of its tautomeric forms wherein the four hydroxy groups are acetylated. These phenomena are explained by the partial isomerization of purpuromycin to isopurpuromycin during the acylation reaction carried out in pyridine.

By reacting purpuromycin with acylating agents such as, for example, acid anhydrides or acyl chlorides in pyridine, but operating at a temperature varying between about 0° to about 30°C, isomerization does not take place. Under these conditions, if substantially equimolecular proportions of acylating agent and purpuromycin are employed instead of a large excess as in the case of the acetylation described above, the monoacyl derivative of purpuromycin is obtained. Chemicophysical data demonstrate that the hydroxy group reacted is the one having alcoholic character. Representative members of this class of compounds include the following mono esters of purpuromycin: hydrogen succinate, hydrogen maleate and glycolate, i.e., a compound of the formula

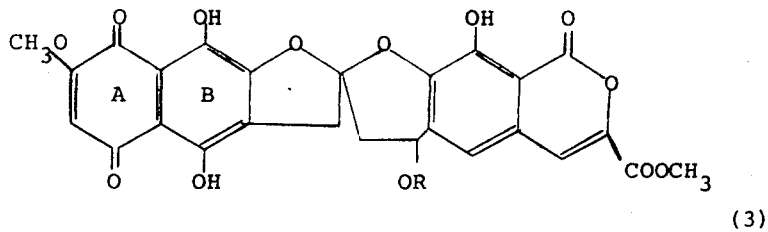

(3)

and its keto-enol tautomers wherein R is a —CO—CH$_2$—CH$_2$—COOH, —CO—CH=CH—COOH or a —CO—CH$_2$OH group.

The antibiotic compounds of the invention are active against Gram positive and Gram negative microorganisms and fungi; in particular they are active against *Staphylococcus aureus, Streptococcus hemolyticus, Diplococcus pneumoniae* at doses varying from 0.005 to 0.1 µg/ml. As an example, the following table illustrates the antimicrobial activity of purpuromycin using conventional agar plate tests.

Table 1

| Microorganism | Minimal Inhibitory Concentration µg/ml. |
|---|---|
| *Staphylococcus aureus* ATCC 6538 | 0.005 |
| *Staphylococcus aureus* Tour | 0.01 |
| *Streptococcus hemolyticus* C 203 | 0.02 |
| *Diplococcus pneumoniae* UC 41 | 0.02 |
| *Staphylococcus aureus* Tour with 10% bovine serum | 2 |
| *Clostridium perfringens* ISS 30543 | 0.05 |
| *Proteus vulgaris* X 19 H ATCC 881 | 1 |
| *Escherichi coli* SKF 12140 | 0.5 |
| *Candida albicans* SKF 2270 | 0.5 |
| *Trichophyton mentagrophytes* SKF 17410 | 0.2 |
| *Mycobacterium tub.* H37Rv ATCC 9360 | 50 |
| *Mycoplasma gallisepticum* H 21 C.Z.B. | 5 |

The other antibiotic substances of the invention display similar activity against the same organisms. For example, the following minimal inhibitory concentrations, µg/ml., were found against *Staphylococcus aureus* ATCC 6538:

| | |
|---|---|
| Acetyl derivative I | 0.05 |
| Acetyl derivative II | 0.1 |
| Purpuromycin hydrogen maleate | 0.01 |
| Purpuromycin hydrogen succinate | 0.1 |

The compounds are also active against strains which are resistant to other antibiotics widely used in actual chemotherapeutic practice. As a representative example, the following table gives minimal inhibitory concentrations (M.I.C.), µg/mil., g/ml., purpuromycin against *Staphylococcus aureus* strains resistant to the several indicated antibiotics.

Table 2

| Strain | M.I.C. of other antibiotics | M.I.C. of Purpuromycin |
| --- | --- | --- |
| Staphylococcus aureus ATCC 6538 resistant to penicillin | Penicillin 100 | 0.005 |
| Staphylococcus aureus ATCC 6538 resistant to streptomycin | Streptomycin 100 | 0.005 |
| Staphylococcus aureus ATCC 6538 resistant to tetracycline | Tetracycline 100 | 0.005 |
| Staphylococcus aureus ATCC 6538 resistant to Novobiocin | Novobiocin 100 | 0.001 |
| Staphylococcus aureus ATCC 6538 resistant to neomycin | Neomycin 20 | 0.002 |
| Staphylococcus aureus ATCC 6538 resistant to erythromycin | Erythromycin 50 | 0.002 |
| Staphylococcus aureus ATCC 6538 resistant to chloramphenicol | Chloramphenicol 50 | 0.001 |
| Staphylococcus aureus ATCC 6538 resistant to Ceporin | Cephaloridine 100 | 0.003 |
| Staphylococcus aureus ATCC 6538 resistant to streptothricin | Streptothricin 50 | 0.005 |
| Staphylococcus aureus ATCC 6538 resistant to bacitracin | Bacitracin 20 | 0.002 |
| Staphylococcus aureus ATCC 6538 resistant to oleandomycin | Oleandomycin 20 | 0.005 |
| Staphylococcus aureus ATCC 6538 resistant to rifamycin SV | Rifamycin SV 100 | 0.005 |

Purpuromycin also exhibits an interesting activity in vivo against lymphoid leukemia L-1210 in mice at a dose level of 400 mg./kg. Another favorable characteristic of the compounds of the invention is a low toxicity since the values of the $LD_{50}$ p.o. are generally higher than 1000 mg./kg. in mice.

Accordingly, the present invention makes possible an antibacterial composition comprising as the active ingredient a novel compound of the invention together with a pharmaceutically acceptable carrier.

Description of *Actinoplanes ianthinogenes* nov. sp. A/1668

The colonies grown for a few weeks on oatmeal agar are 0.5 to 0.8 centimeter in diameter and have irregular contours. The surface is opaque and slightly rough to wrinkled. The strain grows well on different media with a violet color of the substrate mycelium. On oatmeal agar it produces a slightly diffusible violet pigment. Aerial mycelium is always absent. At microscopic examination the vegetative mycelium reveals branched hyphae with a diameter of about 1μ. The sporangia form abundantly only on oatmeal agar and Czapek glucose agar and are globose with an irregular surface, and a diameter ranging from 4.0 to 10.0μ. Sporangial release is observed after rupture of the wall of the sporangium. The sub-spherical spores are motile (1.4 to 1.8μ diameter).

Following Table 3 reports the cultural characteristics of *Actinoplanes ianthinogenes* nov. sp. A/1668 cultivated on various standard media suggested by Shirling and Gottlieb (Intern. J. Syst. Bact., 16, 313–340, 1966) and other media recommended by Waksman (The Actinomycetes, Vol. II. The Williams and Wilkins Co., 1961). The cultural characteristics were determined after 6 to 14 days of fermentation at 30°C.

Table 3

The number of some of the culture media refer to those given by Shirling and Gottlieb.

| Culture Medium | Cultural Characteristics |
| --- | --- |
| Medium n. 2 (Yeast extract-malt agar) | Abundant growth, wrinkled, light amber with violet zones |
| Medium n. 3 (oatmeal agar) | Moderate growth, crusty, light violet |
| Medium n. 4 (Inorganic salts-starch agar) | Abundant growth, smooth surface, deep orange with violet zones |
| Medium n. 5 (Glycerol-asparagine agar) | Abundant growth, rough surface, amber with violet zones |
| Medium n. 6 (Peptone-yeast extract iron agar) | Scanty growth, smooth surface, opaque, deep brown |
| Medium n. 7 (Tyrosine agar) | Moderate growth, rough surface, opaque, amber to light brown |
| Oatmeal agar (according to Waksman) | Abundant growth, wrinkled, orange with violet zones, weak, violet pigment |
| Hickey and Tresner's agar | Moderate growth, crusty, light brown |
| Czapeck glucose agar | Scanty growth, thin, opaque, hyaline |
| Glucose asparagine agar | Abundant growth, crusty, light orange with violet zones |
| Nutrient agar | Scanty growth, thin orange to brown |
| Potato agar | Moderate growth, crusty, violet |
| Bennett's agar | Abundant growth, wrinkled, light brown with surface violet |
| Calcium malate agar | Very scanty growth, thin light orange |
| Skim milk agar | Abundant growth, wrinkled violet with orange edges |
| Czapeck agar | Moderate growth, crusty, opaque, hyaline |
| Egg agar | Moderate growth, crusty, opaque, hyaline |
| Peptone glucose agar | Moderate growth, deep orange |
| Agar | Very scanty growth, thin, hyaline |
| Loeffler serum | Moderate growth, rough surface orange with violet zones |
| Potato | Moderate growth, wrinkled, deep orange |
| Gelatin | Scanty growth, crusty, light violet |
| Cellulose agar | Very scanty growth, thin, hyaline |

The most convenient temperature for development of the colonies was found to range from about 20° to about 45°C, the optimum temperature being from about 28° to about 37°C.

Following Table 4 reports the utilization of carbon sources examined according to the method Pridham and Gottlieb. (J. Bact. 56, 107, 1948)

Table 4

| Carbon Source | Utilization |
| --- | --- |
| Inositol | − |
| Fructose | + |
| Rhamnose | + |
| Mannitol | + |
| Xylose | + |
| Raffinose | − |
| Arabinose | + |
| Cellulose | − |
| Sucrose | + |
| Glucose | + |
| Mannose | + |
| Lactose | − |
| Salicin | + |

Following Table 5 reports the physiological characteristics of the strain.

Table 5

| Test | |
| --- | --- |
| Hydrolysis of starch | positive |
| $H_2S$ formation | weakly positive |
| Tyrosinase reaction | negative |
| Casein hydrolysis | positive |
| Solubilization of calcium malate | weakly positive |
| Nitrate reduction | positive |
| Liquefaction of gelatine | positive |
| Litmus milk { coagulation | negative |
| { peptonization | negative |
| Cellulose decomposition | negative |
| Chromogenic action | positive |

Production of the antibiotic purpuromycin

For producing the antibiotic substance, the strain *Actinoplanes ianthinogenes* nov. sp. A/1668 is aerobically pre-cultured in a nutrient medium until substantial antibiotic activity is present. As an example, a shake flask culture may have the following composition in g/l:

| | |
| --- | --- |
| Meat extract | 3.0 |
| Yeast extract | 10.0 |
| Starch | 25.0 |
| Calcium carbonate | 4.0 |
| Tap water q.s. to 1000 ml. | |

The flasks are shaken for about 24 hours at 28° to 30°C. and then the pre-cultures (1 liter) are used to inoculate the jar fermentors each containing 10 liters of the following nutrient medium:

| | |
| --- | --- |
| Meat extract | 40 g |
| Peptone | 40 g |
| Yeast extract | 10 g |
| Sodium chloride | 25 g |
| Soybean meal | 100 g |
| Glucose | 500 g |
| Calcium carbonate | 50 g |
| Tap. water q.s. to 10 liters | |

The fermentation batches are incubated aerobically under stirring at 28° to 30°C. At intervals, the antibiotic activity is assayed microbiologically by the agar diffusion method using *Staphylococcus aureus* as the test organism. The maximum activity is reached after 96 to 120 hours of fermentation.

The fermented broth is adjusted to a pH of substantially 3.5 by addition of aqueous 8% HCl and then extracted with ethyl acetate. Upon concentration of the organic extract, a crude precipitate is obtained which is recovered by filtration. By addition of light petroleum to the filtrate, further crude compound is obtained. The first crop is washed with methanol and then may be purified by column chromatography. The second precipitate, after thorough washing with methanol, is added to the first crop before chromatography.

To isolate the purpuromycin, the amorphous matter is dissolved in a chloroform:methanol mixture of 95:5 and to the so-obtained solution a small amount of silica gel is added. The mixture is evaporated to dryness and the solid mixture obtained is added to the top of a silica gel column buffered with 0.5N $KH_2PO_4$. Elution with chloroform and chloroform containing up to 2 per cent methanol gives a product which is crystallized from the same solvent system. Purpuromycin as produced by the above method is a purple red crystalline substance having the following properties:

1. Melting point:

Purpuromycin decomposes at 212°C. and does not melt up to 320°C.

2. Elemental analysis: C: 57.90%; H: 3.38%; O: 38.72% (by difference).

3. U.V. and visible absorption bands:

Purpuromycin in chloroform solution (the initial solution of the sample is in dioxane) shows the following values:

| $\lambda$ max (m$\mu$): | $E_{1\,cm.}^{1\%}$: |
| --- | --- |
| 312 | 448 |
| 353 | 240 |
| 368 | 216 |
| 480 | (shoulder) |
| 505 | 220 |
| 545 | (shoulder) |

The complete picture of the spectrum is given in FIG. 1. The spectrum was recorded with Perkin Elmer Spectracord 4000 A instrument.

4. Infrared spectrum:

The most significant absorption peaks in Nujol occur at the following frequencies (cm.$^{-1}$):

3510, 3070, 1730, 1685, 1610, 1590, 1500, 1330, 1275, 1230, 1210, 1150, 1120, 1100, 1080, 1060, 1040, 1010, 995, 970, 950, 930, 900, 890, 865, 830, 800, 790, 770, 750, 730.

Figure 2:
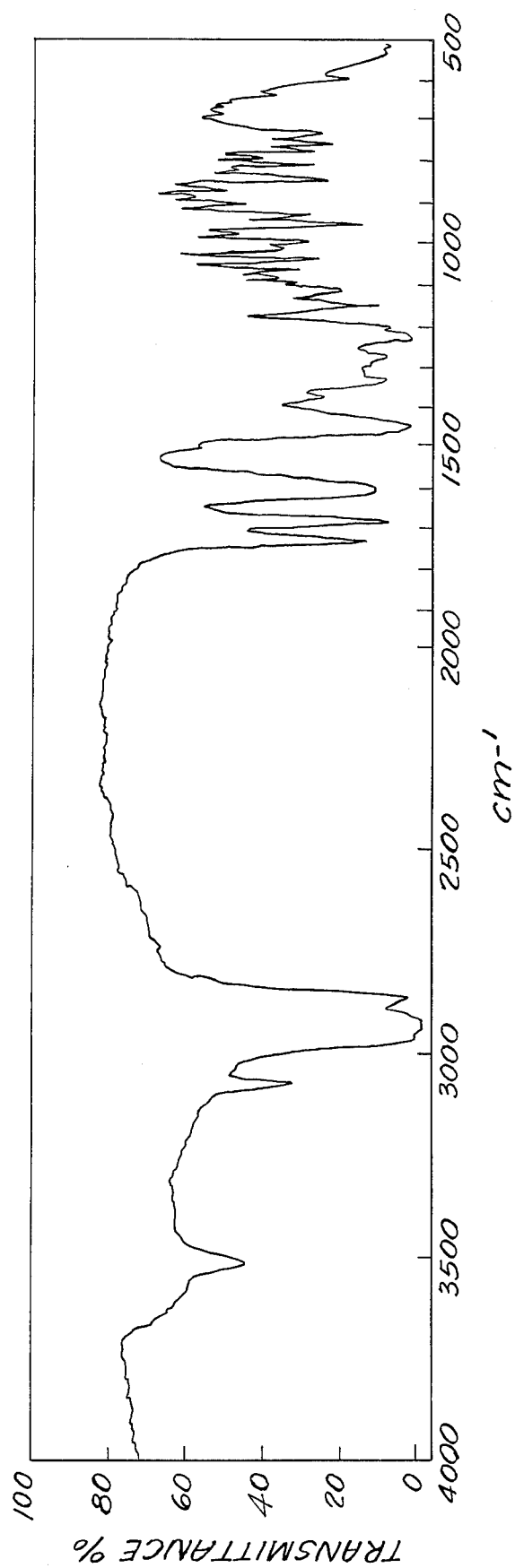

Nujol peaks are not considered. A complete figure of the I.R. spectrum is given in FIG. 2. The spectrum was recorded with Perkin Elmer Mod. 421 instrument.

5. Mass spectrum:

The mass spectrum obtained at 70 eV does not show in this case the molecular ion peak M+. The most significant peaks are recorded at the following m/e values:

520, 504, 492, 474, 462, 288, 286, 274, 264, 256, 245, 236, 228.

Figure 3:
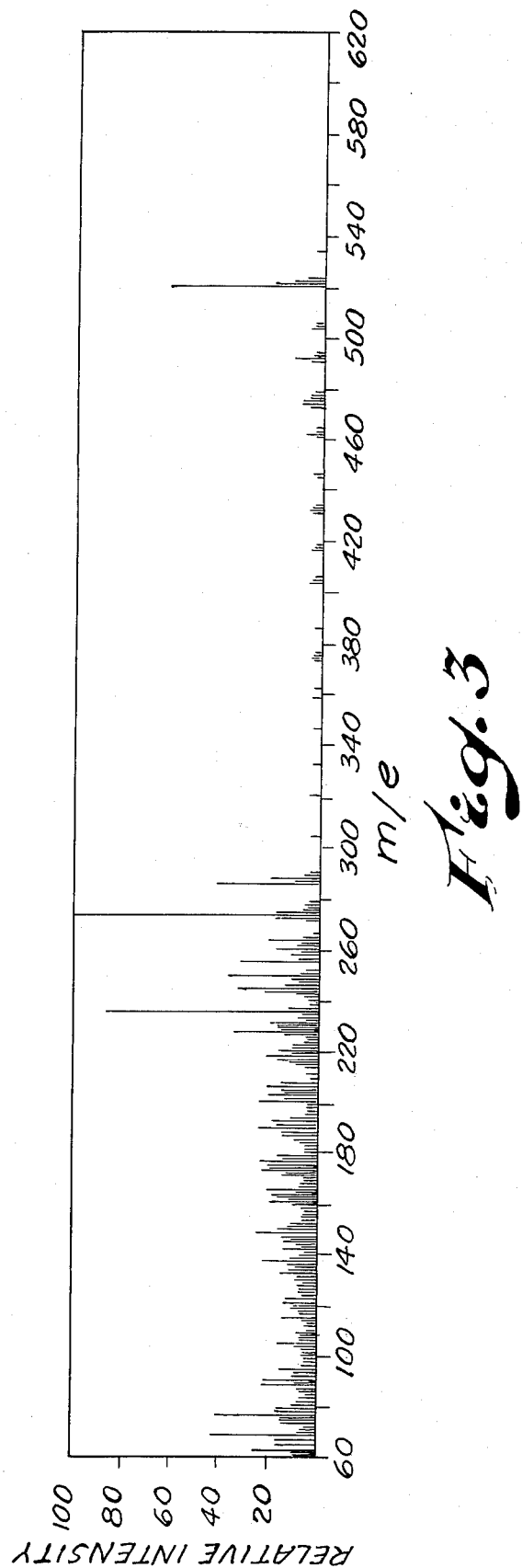

FIG. 3 gives the mass spectrum of purpuromycin. The spectrum was recorded with an Hitachi Perkin Elmer RMU-6L instrument.

6. Polarographic behavior:

Purpuromycin in 50% dimethylformamide solution buffered to pH 9.8 shows a redox potential E1/2=−0.645V.

7. Nuclear magnetic resonance spectrum:

The principal characteristic absorption peaks in $CDCl_3$ and $CF_3COOD$ occur at the following frequencies expressed in $\delta$ units:

$CDCl_3$: 11.13 (1H); 12.11 (1H); 13.03 (1H); 7.48 (1H,s); 7.30 (1H,s); 6.16 (1H,s); 4.8 (1H,m); 4.3 (1H); 3.96 (3H,s); 3.93 (3H,s); 3.84 (1H,d,J=18H$_z$); 3.46 (1H,d,J=18H$_z$); 2.7 (2H,m).

CF$_3$COOD: 7.75 (1H,s); 7.57 (1H,s); 6.48 (1H,s); 5.28 (1H,d,J=4H$_z$); 4.07 (3H,s); 3.98 (3H,s); 3.88 (1H,d,J=18H$_z$); 3.58 (1H,d,J=18H$_z$); 3.06 (1H,d,J=16H$_z$); 2.82 (1H,d,d,J=16H$_z$, 4H$_z$).

In the brackets the characteristic shape of the peak is reported: (s=singlet d=doublet t=triplet m=multiplet) and the number of hydrogen atoms to which the absorption peak is due.

8. Solubility:

Very soluble in aqueous sodium hydroxide

Fairly soluble in aqueous sodium carbonate, dimethylformamide

Sparingly soluble in aqueous sodium bicarbonate, ethyl acetate, dioxane, acetic acid, chloroform, acetone Insoluble in water, methanol, butanol 9. Acidity:

An ionizable function is spectrophotometrically evidenced with pKa 6.8 (in water containing 5% dimethylformamide). On the basis of the number of hydrogen atoms in the NMR spectrum and of the microanalytical data, purpuromycin can be assigned the following empirical formula:

$$C_{26}H_{18}O_{13}$$

All these chemico-physical parameters considered together support the structural formula previously given.

Preparation and characteristics of isopurpuromycin

Fifty milligrams of purpuromycin is suspended in 6 ml. of anhydrous pyridine and the mixture is heated at substantially 100°C. for about 2 to 3 hours. The reaction mixture is poured into ice water and the precipitated solid is washed with chloroform:methanol 95:5 and acetone. Yield 33 mg.

Isopurpuromycin is a purple-red crystalline substance having the following characteristics.

1. Melting point:

Isopurpuromycin does not melt up to 320°C.

2. Elemental analysis: C: 56.51; H: 3.41; O: 40:08 (by difference).

3. U.V. and visible absorption bands:

Isopurpuromycin in chloroform solution (the initial solution of the sample is in dimethylformamide) shows the following values:

| λ max (mµ): | $E_{1\ cm.}^{1\%}$: |
|---|---|
| 322 | 392 |
| 370 | (shoulder) |
| 440 | (shoulder) |
| 465 | (shoulder) |
| 490 | 213 |
| 530 | 170 |

4. Infrared spectrum:

The most significant absorption peaks in Nujol occur at the following frequencies (cm.$^{-1}$):

3570, 3360, 1725, 1670, 1610, 1520, 1400, 1340, 1250, 1215, 1160, 1150, 1110, 1100, 1090, 1070, 1050, 1035, 1000, 970, 920, 890, 840, 820, 800, 770, 710.

5. Mass spectrum:

The mass spectrum is obtained at 70 eV. The most significant peaks are recorded at the following m/e values:

m+ 538, 520, 504, 492, 474, 462, 288, 286, 274, 264, 256, 245, 236, 228.

6. Nuclear magnetic resonance spectrum:

The principal characteristic absorption peaks in CF$_3$COOD occur at the following frequencies expressed in δ units:

CF$_3$COOD: 7.86 (1H,s); 7.65 (1H,s); 7.28 (1H,s); 6.69 (1H,s); 5.8 (1H,m); 3.75 (6H,s); 3.6 (2H,m).

In the brackets the characteristic shape of the peaks is reported: (s=singlet d=doublet t=triplet m=multiplet) and the number of hydrogen atoms to which the absorption peak is due.

7. Solubility:

Sparingly soluble in dimethylformamide, pyridine, CF$_3$COOH. Insoluble in all the common solvents and water.

Acetyl derivatives of purpuromycin and isopurpuromycin

Crystalline purpuromycin (300 mg.) is suspended in 6 ml. of pyridine and 6 ml. of acetic anhydride is added. The suspension is heated at 75°C. for 1 hour, then the reaction mixture is poured into ice water and the precipitated solid is filtered. The crude reaction product is chromatographed through a silica gel column buffered with 0.5N KH$_2$PO$_4$ by eluting with chloroform.

The first eluted product is named acetyl derivative I and is crystallized from dimethylsulfoxide containing a small amount of water.

The second eluted product is named acetyl derivative II and is crystallized from acetone.

The compounds have the following characteristics.

Acetyl derivative I

1. Melting point: 195°C.

2. Elemental analysis: Calc. (C$_{36}$H$_{28}$O$_{18}$): C: 57.8; H: 3.74; Found: C: 57.32; H: 3.76; O: 38.92 (by difference).

3. U.V. and visible absorption bands:

Acetyl derivative I in chloroform solution shows the following values:

| λ max (mµ): | $E_{1\ cm.}^{1\%}$: |
|---|---|
| 261 | 526 |
| 265 | (shoulder) |
| 285 | 297 |
| 297 | 292 |
| 335 | (shoulder) |
| 345 | 151 |

4. Infrared spectrum:

The most significant absorption peaks in Nujol occur at the following frequencies (cm.$^{-1}$):

1790, 1775, 1740, 1710, 1670, 1590, 1550, 1340, 1305, 1275, 1260, 1220, 1200, 1180, 1105, 1090, 1080, 1060, 1030, 1015, 980, 960, 940, 915, 890, 870, 860, 824, 805, 793, 773, 763, 720.

5. Mass spectrum:

The mass spectrum was obtained at 70 eV. The most significant peaks are recorded at the following m/e values:

M+ 748, 706, 664, 646, 622, 604, 580, 562, 520, 504, 492, 474, 462, 288, 286, 274, 264, 256, 245, 236, 228.

6. Nuclear magnetic resonance spectrum:

The principal characteristic absorption peaks in CDCl$_3$ occur at the following frequencies expressed in δ units:

CDCl$_3$: 7.06 (1H,s); 7.50 (1H,s); 6.91 (1H,s); 6.60 (1H,s); 6.31 (1H,t,J=6.5H$_z$); 3.99 (6H,s); 3.36 (2H,d,J=6.5H$_z$); 2.48 (3H,s); 2.45 (6H,s); 2.42 (3H,s); 2.10 (3H,s).

In the brackets the characteristic shape of the peaks is reported: (s=singlet d=doublet t=triplet m=multiplet) and the number of hydrogen atoms to which the absorption peak is due.

7. Solubility:
Soluble in: ethyl acetate, chloroform, pyridine, dimethylsulfoxide.
Sparingly soluble: acetone, methanol.
Insoluble: water.

On the basis of these chemico-physical characteristics the compound is identified as the pentaacetyl derivative of isopurpuromycin.

Acetyl derivative II

1. Melting point: 254°–258°C.
2. Elemental analysis: Calc. ($C_{34}H_{26}O_{17}$): C: 57.8; H: 3.69; Found: C: 57.12; H: 3.67; O: 39.21 (by difference).
3. U.V. and visible absorption bands:

Acetyl derivative II in chloroform solution (the initial solution of the sample is in dioxane) shows the following values:

| λ max (mμ): | $E_{1\ cm.}^{1\%}$: |
|---|---|
| 262 | (shoulder) |
| 283 | (shoulder) |
| 292 | 523 |
| 307 | (shoulder) |
| 348 | 176 |
| 360 | (shoulder) |

4. Infrared spectrum:
The most significant absorption peaks in Nujol occur at the following frequencies (cm.$^{-1}$):
1770, 1755, 1740, 1680, 1650, 1625, 1340, 1325, 1300, 1290, 1255, 1235, 1210, 1190, 1160, 1135, 1115, 1083, 1050, 1030, 1010, 995, 950, 920, 872, 845, 823, 798, 770, 750, 705.

5. Mass spectrum:
The mass spectrum is obtained at 70 eV. The most significant peaks are recorded at the following m/e values:
M+ 706, 664, 646, 622, 604, 580, 562, 520, 504, 492, 474, 462, 288, 286, 274, 273, 264, 256, 250, 236, 228.

6. Nuclear magnetic resonance spectrum:
The principal characteristic absorption peaks in CDCl$_3$ occur at the following frequencies expressed in δ units: CDCl$_3$: 7.65 (1H,s); 7.48 (1H,s); 6.2 (1H,m); 6.03 (1H,s); 3.99 (3H,s); 3.89 (3H,s); 3,67 (1H,d,J=18H$_z$); 3.45 (1H,d,J=18H$_z$); 2.75 (2H,m); 2.46 (3H,s); 2.35 (6H,s); 2.15 (3H,s).

In the brackets the characteristic shape of the peaks is reported: (s=singlet d=doublet t=triplet m=multiplet) and the number of hydrogen atoms to which the absorption peak is due.

7. Solubility:
Soluble in: ethyl acetate, chloroform, pyridine, dimethylsulfoxide, dioxane.
Sparingly soluble in: methanol, acetone.
Insoluble in: water.

On the basis of these chemico-physical characteristics the compound is identified as the tetraacetyl derivative of purpuromycin.

Purpuromycin hydrogen succinate

Purpuromycin (150 mg.) and succinic acid anhydride (33 mg.) in 3 ml. of pyridine are allowed to stand with stirring over night at room temperature. The reaction mixture is poured into ice water and after acidification to pH 3.5 it is centrifuged. The solid recovered is purified by chromatography through a silica gel column with a mixture of chloroform:methanol 98:2 as the eluent. Yield 37 mg. The compound does not melt up to 260°C.

Elemental analysis: Calc ($C_{30}H_{22}O_{16}$): C: 56.4; H: 3.45; Found: C: 55.82; H: 3.58.

The I.R. and NMR spectra confirm the esterification of the alcoholic hydroxy group with one of the two carboxy groups of succinic acid.

Purpuromycin hydrogen maleate

Purpuromycin (200 mg) and maleic anhydride (43 mg) in 3 ml. of pyridine are allowed to stand with stirring over night at room temperature. The reaction mixture is poured into ice water and after acidification to pH 3.5 it is centrifuged. The solid recovered is purified by chromatography through a silica gel column with a mixture of chloroform:methanol 95:5 as the eluent. Yield 40 mg. m.p. 158°C.

Elemental analysis: Calc ($C_{30}H_{20}O_{16}$): C: 56.6; H: 3.18; Found: C: 56.05; H: 3.27.

The I.R. and NMR spectra confirm the esterification of the alcoholic hydroxy group with one of the two carboxy groups of maleic acid.

What is claimed is:
1. A compound designated by the formula

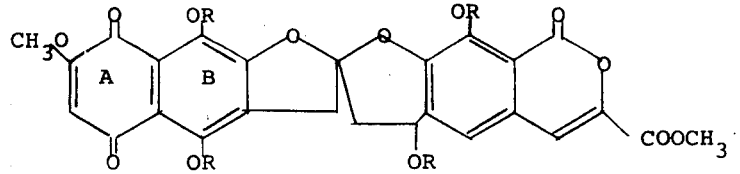

wherein each R represents H or —COCH$_3$.

2. The compound of claim 1 wherein R represents acetyl.

3. A compound designated by the formula

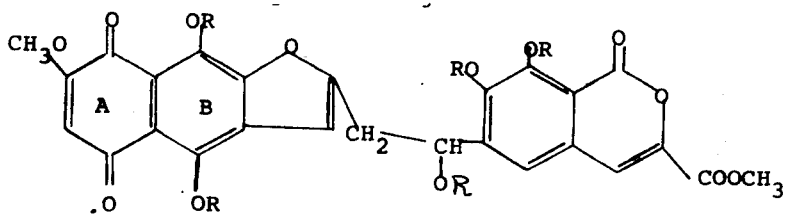

wherein each R represents H or —COCH$_3$.

4. The compound of claim 3 wherein R represents acetyl.

5. A monoacyl derivative of purpuromycin designated by the formula

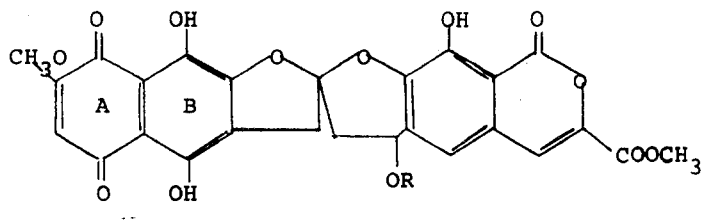

and its keto-enol tautomers wherein R represents an acyl group derived from a C$_2$–C$_4$ mono- or dicarboxylic aliphatic acid which may contain a double bond or may carry a hydroxy group in the chain.

6. A compound of claim 5 wherein R is selected from —CO—CH$_2$—CH$_2$—COOH, —CO—CH=CH—COOH, and —CO—CH$_2$OH.

7. A process for producing the antibiotic substance isopurpuromycin designated by the following structural formula:

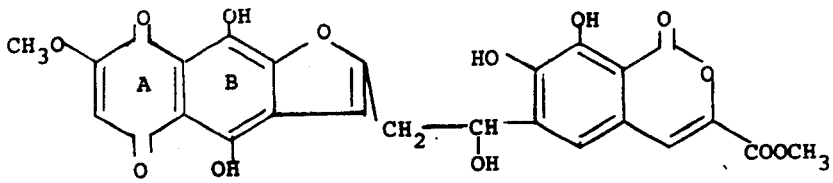

which comprises heating purpuromycin in a mild alkaline medium at about 100°C. for about 2 to 3 hours.

8. A process for producing the substances referred to as acetyl derivative I and acetyl derivative II designated, respectively, as (I) the penta-acetyl derivative of isopurpuromycin and as (II) the tetra-acetyl derivative of purpuromycin which comprises reacting purpuromycin with an acetylating agent in the presence of a mild alkaline medium for about 1 hour and separating the two said reaction products by chromatographic methods.

9. A process for preparing a compound of the formula:

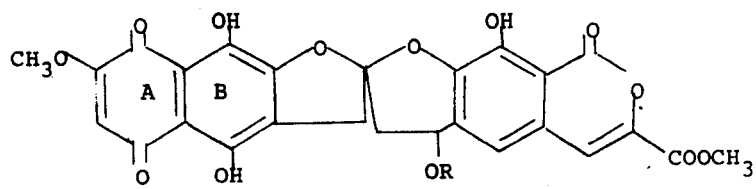

and its keto-enol tautomers wherein R is an acyl group derived from a C$_2$–C$_4$ mono- or dicarboxylic aliphatic acid which may contain a double bond or may carry a hydroxy group in the chain, which comprises reacting purpuromycin with substantially equimolar proportion of an acylating agent selected from acid anhydrides and acyl chlorides wherein the acid or acyl group is derived from a C$_2$–C$_4$ mono- or dicarboxylic aliphatic acid which may contain a double bond or may carry a substituent hydroxy radical in the chain at a temperature from about 0° to about 30°C.

10. Process according to claim 9 wherein R is selected from —CO—CH$_2$—CH$_2$—COOH, —CO—CH=CH—COOH and —CO—CH$_2$OH, which comprises reacting purpuromycin with substantially an equimolar proportion of an acylating agent selected from acid anhydrides and acyl chlorides wherein the acid or acyl group is derived from succinic, maleic and glycolic acids.

* * * * *

UNITED STATES PATENT AND TRADEMARK OFFICE
CERTIFICATE OF CORRECTION

PATENT NO. : 3,914,257
DATED : October 21, 1975
INVENTOR(S) : Hermes Pagani; Carolina Coronelli; Maria Rosa Bardone; Giancarlo Lancini It is certified that error appears in the above-identified patent and that said Letters Patent are hereby corrected as shown below:

On the first page, following "[76] Inventors: Hermes Pagani; Carolina Coronelli; Maria Rosa Bardone, all of Milan; Giancarlo Lancini, Pavia, all of Italy" insert --[73] Assignee: Gruppo Lepetit S.p.A., Milano, Italy--;

Column 4, line 66, "µg/mil., g/ml.," should read --µg/ml.,--;

Column 6, line 67, after "method" insert --of--;

Column 8, line 46, after "with" insert --a--;

Column 13, Claim 6, line 30, second formula, "-CO-CH=$\lambda$" should read -- -CO-CH= --.

Signed and Sealed this

Sixth Day of July 1976

[SEAL]

Attest:

RUTH C. MASON
*Attesting Officer*

C. MARSHALL DANN
*Commissioner of Patents and Trademarks*